(12) United States Patent
Kageyama

(10) Patent No.: US 6,347,266 B1
(45) Date of Patent: Feb. 12, 2002

(54) AUTOMATIC TRAVELING VEHICLE WITH OBJECT DETECTOR

(75) Inventor: Masato Kageyama, Oyama (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/138,478

(22) Filed: Aug. 21, 1998

(30) Foreign Application Priority Data

Aug. 22, 1997 (JP) ............................................. 9-240258

(51) Int. Cl.[7] .............................. G01C 3/00; G01C 3/08; B62D 1/24
(52) U.S. Cl. ............................ 701/25; 701/26; 340/435
(58) Field of Search ............................... 701/23, 25, 26, 701/300, 301, 302; 340/435, 436, 438, 903, 935, 943; 342/70, 71, 455; 367/95, 96, 99, 87, 103, 118, 119; 180/282, 169

(56) References Cited

U.S. PATENT DOCUMENTS

| | | | | |
|---|---|---|---|---|
| 4,328,545 A | * | 5/1982 | Halsall et al. ............... 364/424 |
| 4,537,271 A | * | 8/1985 | Ito et al. ...................... 180/131 |
| 4,790,402 A | * | 12/1988 | Field et al. ................... 180/169 |
| 4,967,860 A | * | 11/1990 | Kremser ....................... 180/169 |
| 5,229,941 A | * | 7/1993 | Hattori .................... 364/424.02 |
| 5,530,651 A | * | 6/1996 | Uemura et al. .............. 364/461 |
| 5,808,728 A | * | 9/1998 | Uehara ........................ 356/5.01 |
| 5,887,268 A | * | 3/1999 | Furukawa ..................... 701/23 |
| 5,970,433 A | * | 11/1999 | Oka et al. .................... 702/159 |

FOREIGN PATENT DOCUMENTS

JP 5-203746 8/1993

* cited by examiner

Primary Examiner—Tan Nguyen
Assistant Examiner—Dalena Tran
(74) Attorney, Agent, or Firm—Sidley Austin Brown & Wood

(57) ABSTRACT

A automatic traveling vehicle that may travel at high speed along a predetermined course without colliding or interfering with detected objects within the course. The vehicle radiates a directional medium and analyzes any reflections to determined the presence of objects along the course. The vehicle combines predetermined, stored information with currently detected information to ensure the farthest possible distance for object detection and increased reliability for preventing collision and interference with detected objects.

22 Claims, 5 Drawing Sheets

AUTOMATIC TRAVELING VEHICLE WITH OBJECT DETECTOR

FIELD OF THE INVENTION

The present invention relates to an automatic traveling vehicle, and in particular, to an automatic traveling vehicle with an object detector that can travel at high speed without colliding or interfering with a detected object.

BACKGROUND OF THE INVENTION

There exists an automatic traveling vehicle comprising a directional medium receiver and transmitter means to radiate a directional medium (for example, light, a millimeter wave, or an ultrasonic wave) and receive a reflected wave from an object in a direction consistent with vehicle travel; an actuator for changing the direction of radiation of the directional medium, which is mounted on the directional medium receiver and transmitter means; and an object detector for analyzing an object detection status after receiving a reflected wave from an object transmitted by the directional medium receiver and transmitter means.

The directional medium receiver and transmitter means comprises a light transmitting unit and a light receiving unit if the directional medium is light, for example, or comprises a transmitting and receiving antenna if the directional medium is a millimeter wave or an ultrasonic wave. The actuator for changing the direction of radiation of the directional medium is a scanner which allows the directional medium to be directed at an angle within a predetermined angular range by, for example, pivoting the directional medium receiver and transmitter means. The object detector receives reception and transmission information (in other words, a frequency, a reception and transmission strength, and the like) regarding the directional medium produced and received by the directional medium receiver and transmitter means. The object detector further analyzes an object detection status (in other words, whether or not any object is detected, a distance to an object, a relative speed to an object, and the like). The analysis results are entered into a separate control unit having a stored control program. In accordance with the control program, the control unit controls the speed of the vehicle by operating an alarm or by operating a vehicle speed control actuator (for example, an accelerator or a brake). This prevents the vehicle from colliding with the detected object and from interfering with it.

Japanese Unexamined Patent Publication (A) No. 5-203746 discloses an actuator for changing the direction of radiation of the directional medium based on a steering operation, where a directional medium receiver and transmitter means is rotated so as to match a directional medium with a steering angle. This actuator has the following problems.

(1) In a curved course Cc, as shown in FIG. 7, a directional medium A is emitted along a curvature of the curved course Cc in accordance with a steering angle. A detection area to be treated by an object detector is area AC1, formed by overlapping regions of a directional medium A and the indicated area XC of course C followed by vehicle 1, which does not include areas further along course Cc.

(2) In an irregularly curved course Cs, as shown in FIG. 8, a directional medium A is emitted along a curvature of a first curve Cc. Due to steering angle limitations, a detection area AC1 does not include areas further along course Cs.

(3) In a straight course Ct, as shown in FIG. 9, supposing a misaligned vehicle 1 is subject to a steering operation to return the vehicle 1 to the center of course Ct, the steering angle causes a radiated directional medium A to be directed toward the edge of course Ct. Thus, a detection area AC1 does not include areas further along course Ct.

In this type of an automatic traveling vehicle, a vehicle control and other operations are performed on the basis of the effective detection area AC2, and the effective detection area AC2 is often a short distance; therefore, control of the vehicle 1 is forced to be performed at a low speed. Accordingly, for an unmanned dump truck that must travel, for example, in a mine, improved productivity cannot be expected.

For any of the above cases, an effective detection area AC2 may extend further than the detection area AC1 if the directional medium A is pivoted by an actuator for changing the direction of radiation of the directional medium. The region defined by reference character X (see FIGS. 7–9), or the critical detection region X, designates the maximum pivoting range of the directional medium A using an actuator for changing the direction of radiation of the directional medium.

SUMMARY OF THE INVENTION

In view of these problems in the prior art, it is an object of the present invention to provide an automatic traveling vehicle with an object detector which can travel at high speed in a predetermined course without colliding or interfering with an object detected by an object detector.

According to a first aspect the present invention, there is provided an automatic traveling vehicle with an object detector having a directional medium receiver and transmitter means for radiating a directional medium (for example, light, a millimeter wave, or an ultrasonic wave) in a traveling direction of the automatic traveling vehicle and receiving a reflected wave from an object; an actuator for changing the direction of radiation of the directional medium, and an object detector for analyzing an object detection status after receiving a reflected wave from an object transmitted by the directional medium receiver and transmitter means. The automatic traveling vehicle further includes a predetermined course storage means for storing a predetermined course in a coordinate system; a critical detection area storage means for storing a critical detection area in a coordinate system, the critical detection area being created by direction of the directional medium through a maximum angular range using the actuator for changing the direction of radiation of the directional medium; a current position determining means for determining the current portion of the automatic traveling vehicle in the predetermined course based on course information from the predetermined course storage means; and a calculator means.

The calculator means receives course information from the predetermined course storage means, critical detection area information from the critical detection area storage means, and the current position information of the automatic traveling vehicle from the current position determining means. Using this information, the calculator means determines the farthest portion from the current position of the automatic traveling vehicle in a region defined by the overlapped areas of the critical detection area and the predetermined course. The calculator then outputs a signal to the actuator for changing the direction of radiation of the directional medium so that a radiated direction of the directional medium corresponds to the farthest portion.

According to the above configuration, the automatic traveling vehicle is capable of evaluating the greatest effective detection area. Thus, the automatic traveling vehicle can travel at high speed without colliding or interfering with a detected object.

According to a second aspect of the present invention based on the first aspect thereof, an automatic traveling vehicle includes each of the features set forth above. The automatic traveling vehicle further includes a vehicle speed control actuator to control the speed of the automatic traveling vehicle; an actual vehicle speed detector means to detect an actual vehicle speed; and a predetermined vehicle speed storage means to store predetermined vehicle speed information for each position along the predetermined course.

The calculator means receives actual vehicle speed information from the actual vehicle speed detector means and predetermined vehicle speed information from the predetermined vehicle speed storage means. The calculator outputs an operation signal to the vehicle speed control actuator so that the actual vehicle speed matches the predetermined vehicle speed information, calculates a distance from the current position of the automatic traveling vehicle to the calculated farthest portion, calculates a vehicle speed at which the vehicle can stop in this distance, and renews the predetermined vehicle speed information in the predetermined vehicle speed storage means to a vehicle speed equal to or lower than this vehicle speed.

According to this configuration, a predetermined vehicle speed is automatically renewed to a vehicle speed at which a vehicle can stop in a detected distance. Thus, the automatic traveling vehicle can be controlled more reliably from colliding or interfering with a detected object.

BRIEF DESCRIPTION OF THE DRAWINGS

Referring now to the drawings in which like reference numerals and letters indicate corresponding elements throughout the several views, if applicable.

DETAILED DESCRIPTION OF THE PREFERRED EMBODIMENTS

An automatic traveling vehicle with an object detector (hereinafter, a "vehicle") according to an embodiment of the present invention will be described below in reference to FIGS. 1 to 6. A vehicle of this embodiment is an unmanned dump truck which travels in a predetermined course in a mine or a construction site or the like.

Figure 1:
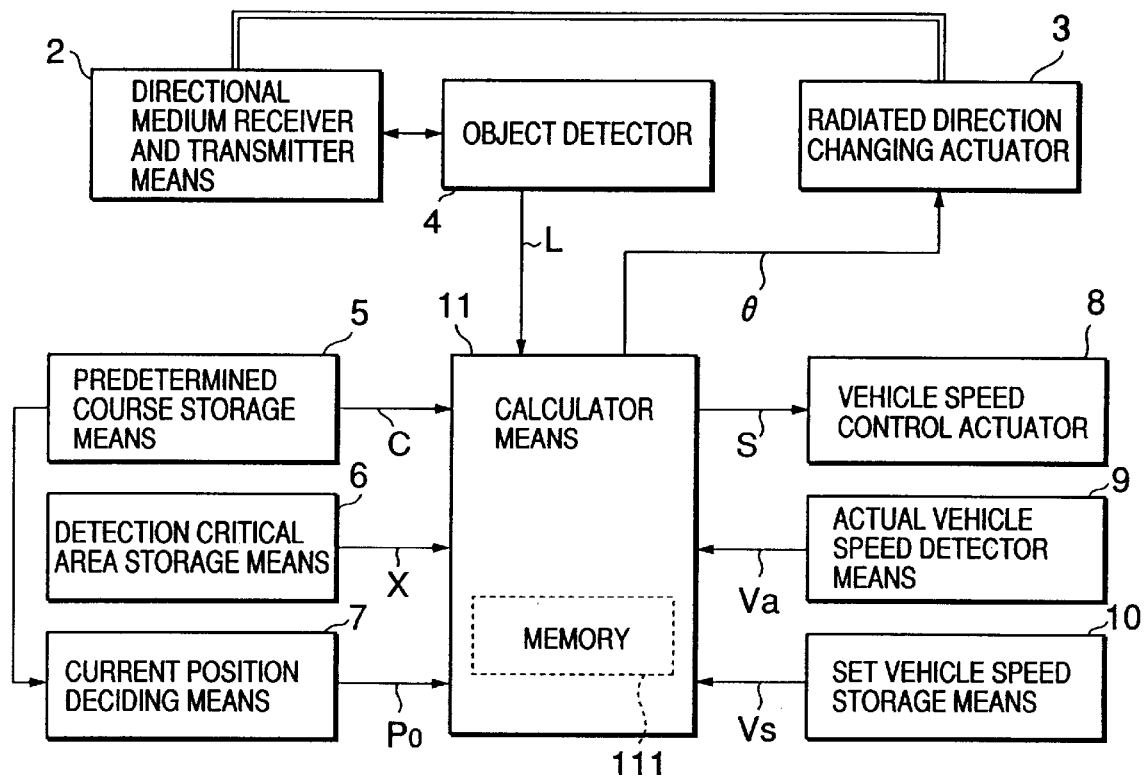
FIG. 1 is a control block diagram for an automatic traveling vehicle with an object detector according to an embodiment of the present invention.

As shown in FIG. 1, the vehicle 1 comprises a directional medium receiver and transmitter means 2, an actuator for changing the direction of radiation of the directional medium 3, an object detector 4, a predetermined course storage means 5, a critical detection area storage means 6, a current position determining means 7, a vehicle speed control actuator 8, an actual vehicle speed detector means 9, a predetermined vehicle speed storage means 10, and a calculator means 11.

The directional medium receiver and transmitter means 2 is a transmitting and receiving antenna for receiving and transmitting millimeter waves (i.e., directional medium A). However, the directional medium receiver and transmitter means 2 may be of such form so as to radiate, for example, light, ultrasonic waves, or the like.

The actuator for changing the direction of radiation of the directional medium 3 is a pulse motor having a servo-control mechanism, which is operatively mounted to the directional medium receiver and transmitter means 2. The actuator 3 allows the directional medium receiver and transmitter means 2 to be freely scanned within an angular range in a horizontal direction or fixed at a desired angle within the angular range, thus allowing the radiated direction of the directional medium A to be controlled in like manner. The actuator 3 is controlled by the calculator means 11 (as described below), and in particular, operation signal θ (a target value) for servo control is entered into a servo control mechanism of the actuator 3 from calculator means 11. Operationally, an actual radiation angle (or radiation range) for the directional medium A is equal to a target radiation angle specified by the operation signal θ (or so that it is scanned within the target radiation range).

The object detector 4 receives reception and transmission information (in other words, a frequency, a reception and transmission strength, and the like) regarding the directional medium A produced and received by the directional medium receiver and transmitter means 2. The object detector 4 further analyzes an object detection status (in other words, whether or not any object is detected, a distance L to an object, a relative speed to an object, and the like). The detected information is sent to the calculator means 11.

As to a millimeter wave system, a signal wave (normally a triangular wave) put on a millimeter wave is radiated from a transmitting antenna in a traveling direction of the vehicle 1, and a reflected wave from an object is received by a receiving antenna. Phases of these transmitted and received waves and wave reception strengths are treated in a pulse system, a two-frequency CW system, and an FM-CW system. In addition, a frequency analysis (for example, a filter bank or a fast Fourier transform [FFT]) is performed to calculate respective distances for a plurality of objects detected simultaneously, together with relative speeds.

The predetermined course storage means 5 is a memory which stores an entire shape of a predetermined course C, including a direction, a distance, and a gradient for a desired interval, in a coordinate system. The information stored in the predetermined course storage means 5 is supplied to the calculator means 11 and the current position determining means 7.

The critical detection area storage means 6 is also a memory, in which a critical detection area X is stored in a coordinate system. The critical detection area X is a value specific to the actuator for changing the direction of radiation of the directional medium 3 and is independent of the predetermined course C. The information stored in the critical detection area storage means is supplied to the calculator means 11.

From information received from the predetermined course storage means 5, the current position determining means 7 determines a current position Po and a current traveling direction of the vehicle 1. The current position determining means 7 may include a gyro, a position information transmitting or receiving system to indicate key places along actual course C, a global positioning system (GPS), or other various devices.

The vehicle speed control actuator 8 is an accelerator or a brake having a servo mechanism capable of freely changing the actual speed of the vehicle 1. Calculator means 11 supplies an operation signal S to the servo mechanism of the vehicle speed control actuator 8. As an operational example, as an actual vehicle speed (Va) becomes equal to a predetermined vehicle speed (Vs), the operation signal S is gradually decreased.

While a servo calculation of the actuator 3 is processed in the servo-control mechanism of the actuator 3 (as described above), a servo calculation for the vehicle speed control actuator 8 is performed in the calculator means 11, as the actual vehicle speed detector means 9 and the calculator means 11 are connected with each other for servo control of the vehicle speed control actuator 8. Naturally, if the actual vehicle speed detector means 9 were connected to a servo mechanism of the vehicle speed control actuator 8 in another configuration of a servo control mechanism, the calculator means 11 would enter the operation signal S into the servo control mechanism simply as a target value in the same manner as for the servo control mechanism of the actuator 3. Regardless, either configuration may be used.

While an accelerator or a brake is operated by an operator in a manual vehicle, the speed of the vehicle 1 may be automatically controlled on the basis of an operating program in the calculator means 11.

The actual vehicle speed detection means 9 is a vehicle speed indicator, which detects an actual vehicle speed (Va) of the vehicle 1. The actual vehicle speed detection means 9 supplies detected speed information to the calculator means 11.

The vehicle speed storage means 10 is also a memory, which stores information on a predetermined vehicle speed (Vs) for each position along the predetermined course C. In this embodiment, the vehicle speed storage means 10 also stores a vehicle speed control program for calculating an automatic vehicle speed control by means of the calculator means 11 using a predetermined vehicle speed (Vs).

The calculator means 11 is, for example, a microcomputer, which receives information from the components identified above. As a summary of information, the calculator means 11 receives analysis result (e.g., whether or not an object is detected, a distance L to an object, a relative speed to an object, and the like) from the object detector 4, information on the predetermined course C from the predetermined course storage means 5, a critical detection area X from the critical detection area storage means 6, a current position Po or a traveling direction of the vehicle 1 from the current position determining means 7, and an actual vehicle speed (Va) from the actual vehicle speed detector means 9. The calculator means 11 also outputs information. Specifically, the calculator means 11 outputs an operation signal θ to the actuator for changing the direction of radiation of the directional medium 3 and an operation signal S to the vehicle speed control actuator 8. Furthermore, it can freely read a predetermined vehicle speed (Vs) signal from the predetermined vehicle speed storage means 10 and write a signal therein.

The calculator means 11 has a memory 111 indicated by a frame outlined by a dashed line in FIG. 1. Memory 111 stores braking start-time vehicle speed (Vb) information for every braking stop distance (Lb). The braking start-time vehicle speed (Vb) is equal to a certain actual vehicle speed (Va). The braking stop distance (Lb) is a braking distance needed to stop the vehicle 1 by hard braking plus a predetermined safety distance (for example, 10 m) when the vehicle 1 traveling at an actual vehicle speed (Va). Variables (Lb) and (Vb) are stored in the memory 111 in as a function (e.g., Vb=f(Lb)) or as a matrix (e.g., Lb→Vb). Memory 111 further stores a vehicle speed control program and an operating program. The calculator means 11 may freely read any information stored in memory 111.

Figure 3:
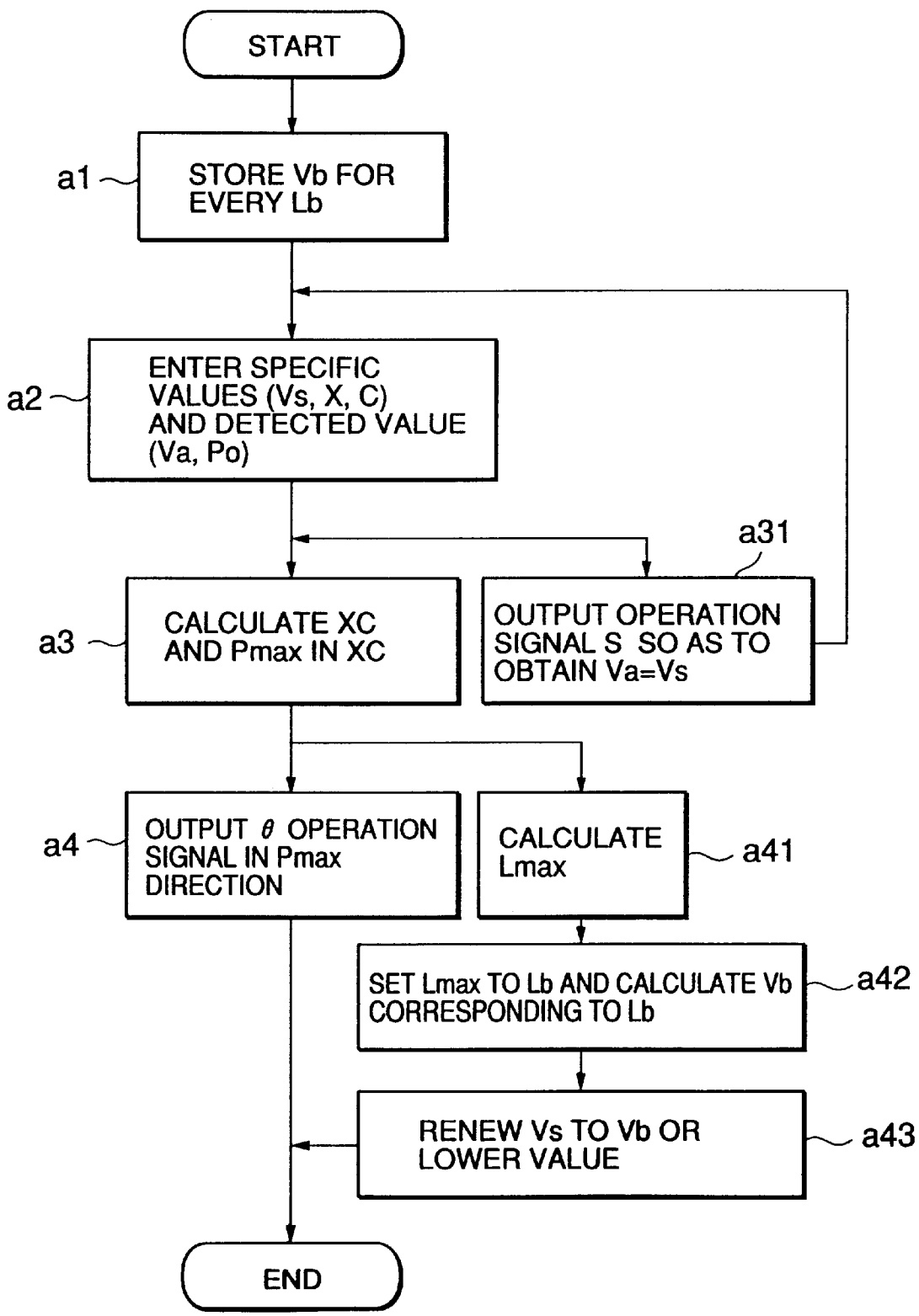
FIG. 3 is an operational flowchart of an object detection according to the embodiment.

An example of an operating program with the calculator means 11 will be described below by reference to FIG. 3. The operating program illustrated in FIG. 3 represents only a main portion.

In step a1, the calculator means 11 stores a braking start-time vehicle speed (Vb) for every braking stop distance Lb and a vehicle speed control program in addition to this operating program in the memory 111.

In step a2, the calculator means 11 receives signals such as a predetermined vehicle speed (Vs) from the predetermined vehicle speed storage means 10, a critical detection area X from the critical detection area storage means 6, and predetermined course C information from the predetermined course storage means 5, as specific values, while the vehicle 1 is traveling. As detection values, the calculator means 11 receives actual vehicle speed (Va) values from the actual vehicle speed detector means 9 and a current position Po (or a traveling direction) of the vehicle 1 from the current position determining means 7. As discussed above, calculator means 11 also receives an analysis result from the object detector 4 (not shown).

In step a31, the calculator means 11 outputs an operation signal S to the servo mechanism of the vehicle speed control actuator 8 in accordance with the vehicle speed control program, so that the actual vehicle speed (Va) is equal to the predetermined vehicle speed (Vs). By this operation, the vehicle 1 travels along the predetermined course C automatically at the predetermined vehicle speed (Vs). While the vehicle 1 is, for example, an unmanned dump truck, the vehicle speed control program contains a steering control program and the like and therefore it can travel automatically along the predetermined course.

Steps a3 and a4 are performed in parallel with step a31, while steps a41 to a43 are performed in parallel with step a4.

Step a3 will be described in reference to FIG. 2. The calculator means 11 first calculates an area XC (a hatched area covered by oblique lines with right-hand ends upward as shown) consisting of the overlapped areas of the critical detection area X (viewed from the current position Po of the vehicle 1) and the predetermined course C. The calculator means 11 then calculates the farthest portion Pmax from the current position Po of the vehicle 1 in the overlapped area XC. The overlapped area XC and the farthest portion Pmax are calculated geometrically since information on the predetermined course C and the critical detection area X is stored in a coordinate system.

Figure 2:
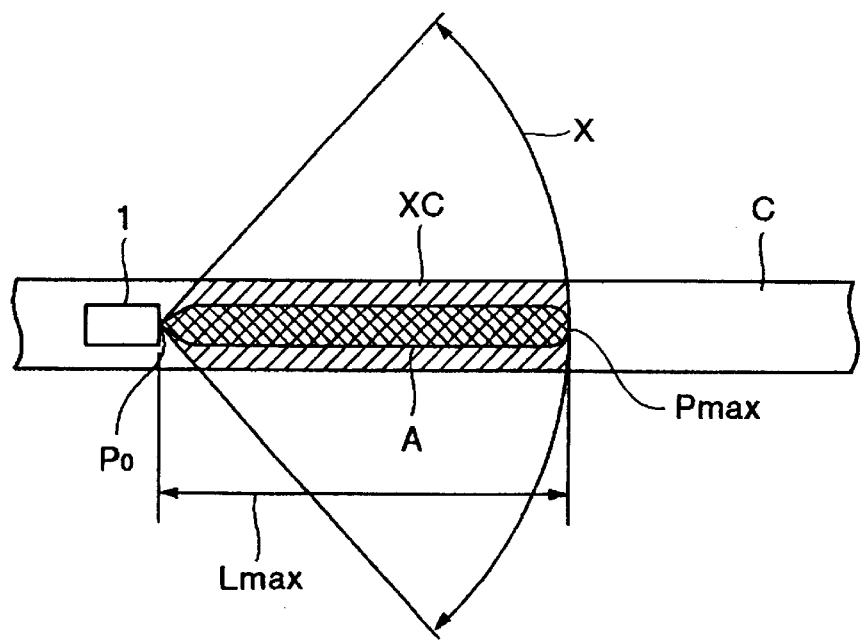
FIG. 2 is an explanatory diagram of an example of an object detecting operation according to the embodiment.

Step a4 will also be described in reference to FIG. 2. The calculator means 11 outputs an operation signal θ (a target value) to the servo-control mechanism of the actuator for changing the direction of radiation of the directional medium 3 so that the radiated direction of the directional medium A matches a direction to the farthest portion Pmax.

In step a41, the calculator means 11 calculates a distance Lmax from the current position Po of the vehicle 1 to the farthest portion Pmax (after determining the farthest portion Pmax in the step a3). Alternatively, there is a calculation method in which a plurality of distances L are compared with each other in the calculation of the farthest portion Pmax (step a3) to determine a position which corresponds to the longest distance among them, the longest distance is then designated as the farthest portion Pmax. In this calculation method, a distance Lmax need not be obtained from the farthest portion Pmax, rather the longest distance obtained in the process for calculating the farthest portion Pmax may be treated as distance Lmax.

In step a42, the calculator means 11 reads out the braking start-time vehicle speed (Vb) for every braking stop distance (Lb) stored in the memory 111, extracts a braking stop distance (Lb) equal to the distance Lmax, and then calculates/obtains the braking start-time vehicle speed (Vb) corresponding to the braking stop distance (Lb). In the memory 111, if both of the variables (Lb) and (Vb) are stored in a function (Vb=f(Lb)), the braking start-time vehicle speed (Vb) is obtained by a calculation, while if the variables (Lb) and (Vb) are stored in a matrix (Lb→Vb), the braking start-time vehicle speed (Vb) is obtained from the matrix.

In step a43, the calculator means 11 sets the currently-used predetermined vehicle speed (Vs) of the automatic vehicle 1 to the braking start-time vehicle speed (Vb) calculated/obtained in step a42 or a lower value. In other words, automatic teaching is performed during operation. Accordingly, the vehicle 1 is controlled to prevent collision or interference with detected objects more reliably.

According to this embodiment, the radiated direction of the directional medium A becomes equal to the farthest portion Pmax predetermined course C in the step a4. Therefore, it is possible to obtain actions and effects as shown in FIGS. 4 to 6.

Figure 4:
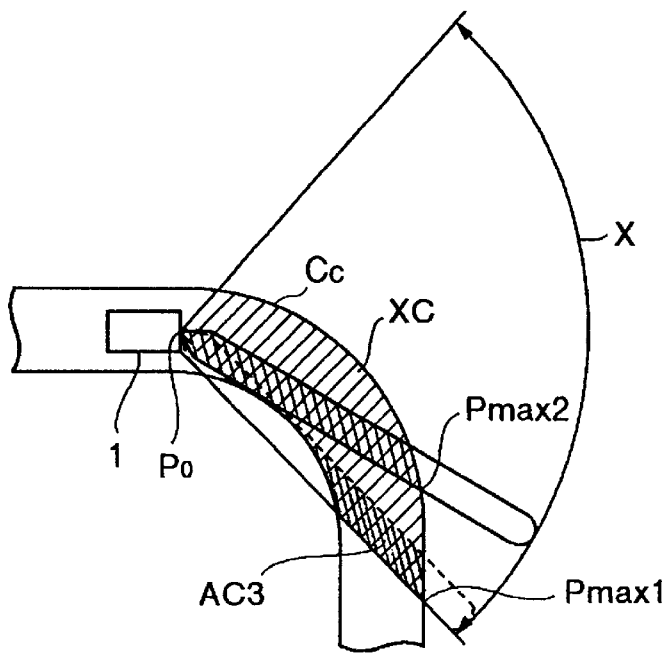
FIG. 4 is an operational explanatory diagram for an object detection in a curved course according to the embodiment.
Figure 7:
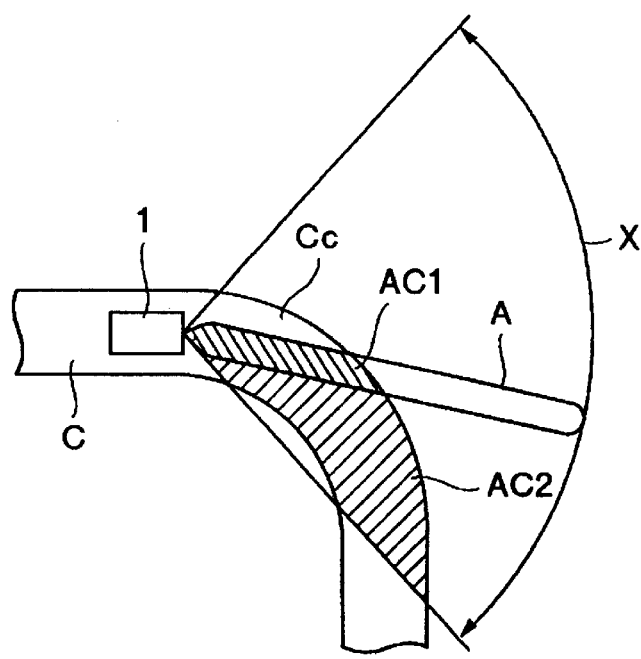
FIG. 7 is an operational explanatory diagram for conventional object detection for a curved course.

For comparison with conventional methods illustrated in FIG. 7, FIG. 4 shows a directional medium A radiated to the farthest portion Pmax2 of overlapped area XC (i.e., an area defined by the overlapping critical detection area X and course C) for a curved course Cc. In comparison with FIG. 7, the detection AC2 is larger than the detection area AC1.

Of note, the detection area AC2 can be furthered to, for example, a detection area AC3. If there is any construction, a mountain, or a steep cliff inside the curved course Cc (i.e., the lower portion in the drawing), it may be previously stored in the predetermined course storage means 5 so as to create an operating program in which the farthest portion Pmax2 is set to Pmax1.

Figure 5:
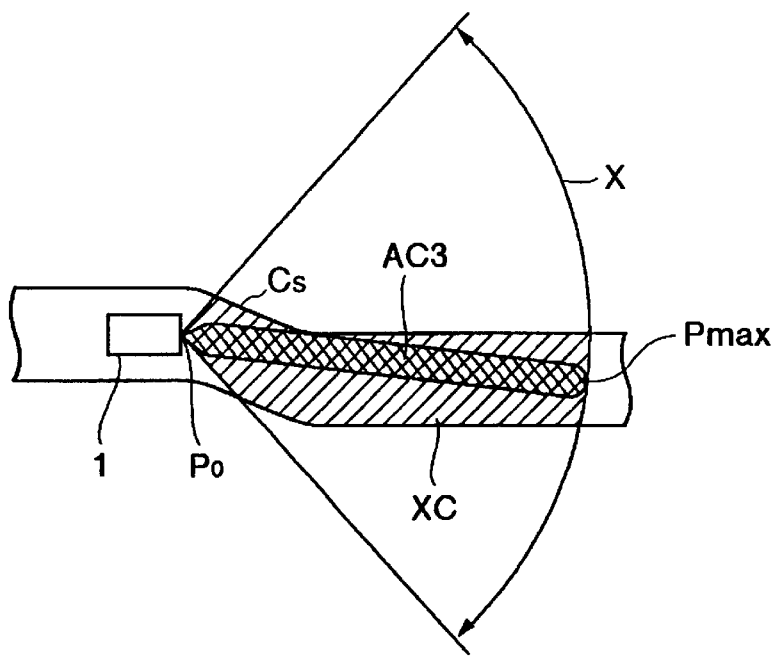
FIG. 5 is an operational explanatory diagram in an irregularly curved course according to the embodiment.
Figure 6:
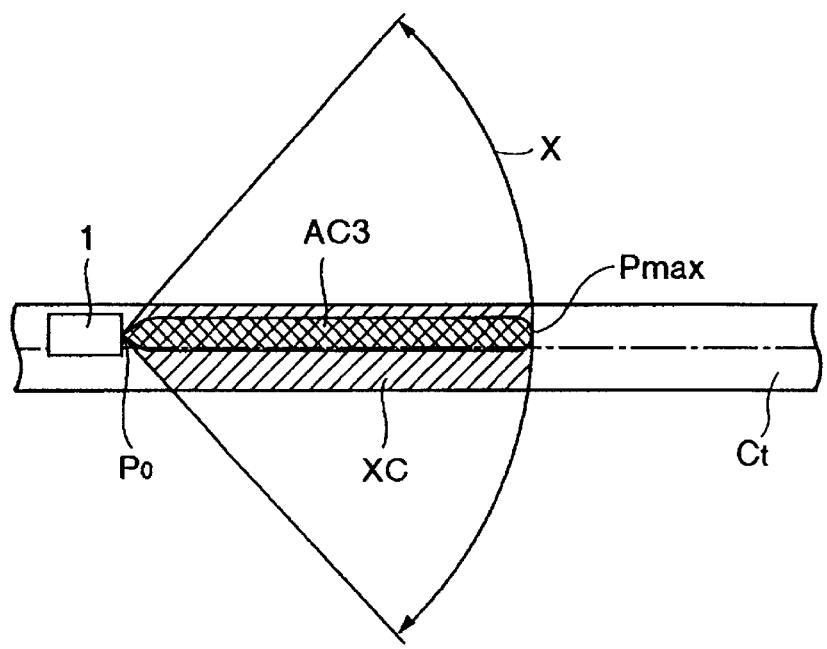
FIG. 6 is an operational explanatory diagram in a straight course according to the embodiment.
Figure 8:
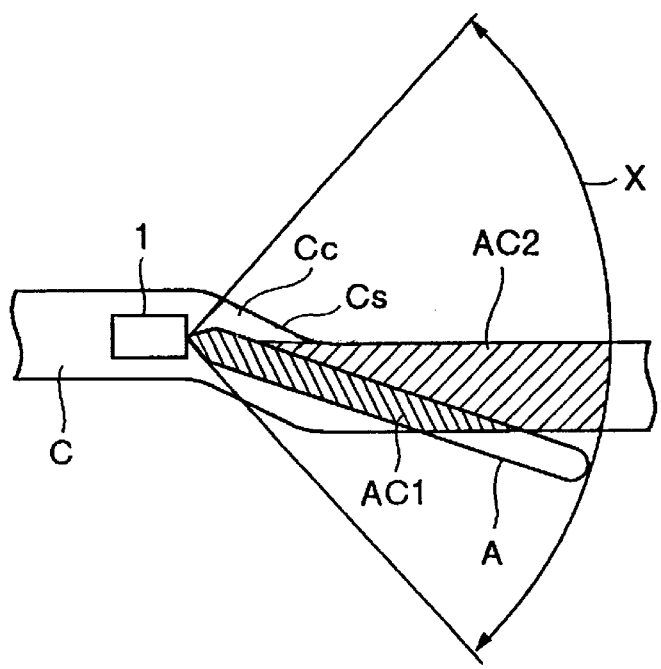
FIG. 8 is an operational explanatory diagram for conventional object detection for an irregularly curved course.

For comparison with conventional techniques illustrated in FIG. 8, FIG. 5 shows a directional medium A radiated to the farthest portion Pmax of overlapped area XC for the irregularly curved course Cs. In comparing FIG. 8, the detection area AC2 is larger than the detection area AC1.

Figure 9:
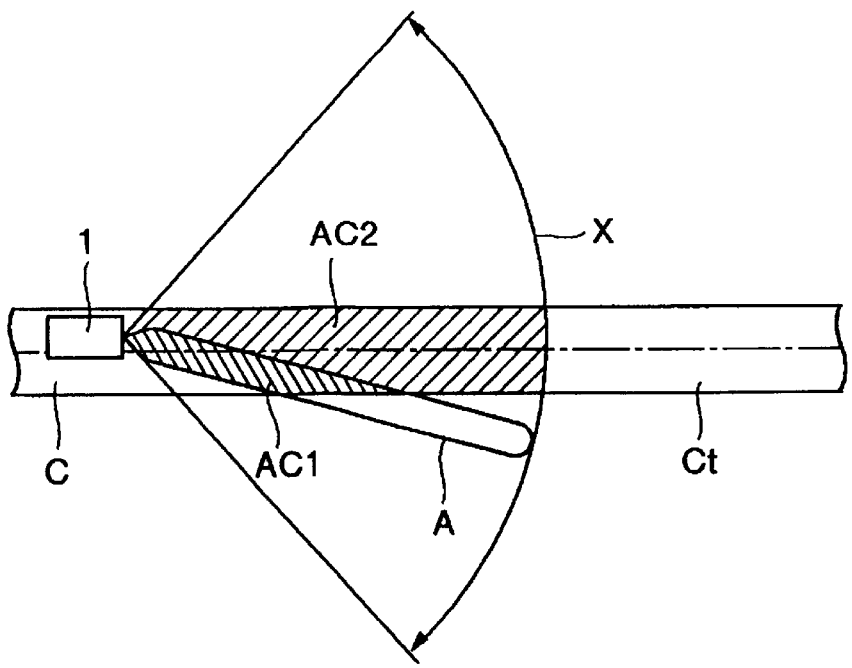
FIG. 9 is an operational explanatory diagram for conventional object detection for a straight course.

For comparison with conventional methods illustrated in FIG. 9, FIG. 6 shows a directional medium A radiated to the farthest portion Pmax of the overlapped area XC for a straight course Ct. As before, supposing that the illustrated vehicle 1 is traveling toward the edge of the road (for example, to align the vehicle 1 with the center of course C) due to a steering operation, the detection area AC3 to be processed by the object detector 4 is unaffected by the steering operation and remains directed to Pmax. The calculator means 11 can receive object detection information on the detection area AC3 which is the greatest distance from the object detector 4 (and significantly greater than detection area AC1 of FIG. 6), thus allowing the vehicle 1 to travel at high speed along course Ct.

Next, application examples of this embodiment are outlined below:

(1) While the calculator means 11 directs the directional medium A toward a direction of the farthest portion Pmax in the operating program of this embodiment, a range in the vicinity of the farthest portion Pmax of the overlapped area XC may be scanned if the directional medium A is thin enough. The operation signal $\theta_1$ in this case is assumed to be: $\theta_1=\theta\pm\Delta\theta$, where $2\cdot\Delta\theta$ is a scanning width.

(2) While the actuator for changing the direction of radiation of the directional medium 3 is pivoted in a horizontal direction in the operating program in this embodiment, it may be pivoted vertically in correspondence with a course C having an upward slope or a downward slope.

(3) While the predetermined course storage means 5, the critical detection area storage means 6, and the set vehicle speed storage means 10 are discriminated from the memory 111 of the calculator means 11 in this embodiment, they may be integrated into the memory 111.

What is claimed is:

1. An automatic traveling vehicle to automatically travel along a predetermined travel course, the automatic traveling vehicle comprising:
   a course information storage device to store information corresponding to the predetermined travel course;
   an object detector to detect objects in a path of the vehicle during travel, wherein the object detector directionally radiates a medium in accordance with a signal; and
   a controller, coupled to the course information storage device and the object detector, which receives information from the course information storage device and outputs the signal, wherein the signal represents a direction for radiating the medium.

2. An automatic traveling vehicle in accordance with claim 1, wherein the object detector includes:
   a radiation source for radiating the medium; and
   an actuator to angularly position the medium radiation source within a predetermined angular range in accordance with the signal.

3. An automatic traveling vehicle in accordance with claim 2, wherein the medium radiation source also receives radiated medium reflected from an object in the path of the vehicle.

4. An automatic traveling vehicle in accordance with claim 1, further comprising a critical detection area storage device to store information representative of an actual area defined by the medium radiated through a predetermined angular range,
   wherein the critical detection area storage device is coupled to the controller and supplies information thereto.

5. An automatic traveling vehicle in accordance with claim 1, further comprising a current position detection device to determine a current position of the vehicle relative to the predetermined course during travel,
   wherein the current position detection device is coupled to the controller and supplies information thereto.

6. An automatic traveling vehicle in accordance with claim 1, wherein the medium is an ultrasonic wave.

7. An automatic traveling vehicle in accordance with claim 1, wherein the medium is a millimeter wave.

8. An automatic traveling vehicle in accordance with claim 1, wherein the medium is light.

9. An automatic traveling vehicle in accordance with claim 1, further comprising a vehicle speed control actuator, coupled to the controller, to control a speed of the vehicle in accordance with a speed control signal from the controller.

10. An automatic traveling vehicle in accordance with claim 9, further comprising a predetermined speed storage device, coupled to the controller, to store predetermined speed settings, wherein the controller selects a predetermined speed setting from the predetermined speed storage device and outputs the speed control signal to the vehicle speed control actuator, and wherein the speed control signal represents the predetermined speed setting.

11. An automatic traveling vehicle in accordance with claim 9, further comprising an actual vehicle speed detector, coupled to the controller, to detect an actual speed of the vehicle during travel.

12. An automatic traveling vehicle in accordance with claim 11, further comprising a predetermined speed storage device, coupled to the controller, to store predetermined speed settings, wherein the controller selects a predetermined speed setting from the predetermined speed storage device based on a detected speed of the vehicle and outputs the speed control signal to the vehicle speed control actuator, and wherein the speed control signal represents the predetermined speed setting.

13. An automatic traveling vehicle to automatically travel along a predetermined travel course, the automatic traveling vehicle comprising:

a course information storage device to store information corresponding to the predetermined travel course;

an object detector to detect objects in a path of the vehicle during travel, wherein the object detector directionally radiates a medium in accordance with a signal;

a controller, coupled to the course information storage device and the object detector, which receives information from the course information storage device and outputs the signal, wherein the signal represents a direction for radiating the medium;

a critical detection area storage device to store information representative of an actual area defined by the medium radiated through a predetermined angular range, wherein the critical detection area storage device is coupled to the controller and supplies information thereto; and a current position detection device to determine a current position of the vehicle relative to the predetermined course during travel, wherein the current position detection device is coupled to the controller and supplies information thereto, wherein the direction for radiating the medium matches a direction from the current position of the vehicle to a farthest portion of an overlapped area defined by the predetermined travel course and the area defined by a radiated medium through a predetermined angular range.

14. An automatic traveling vehicle to automatically travel along a predetermined travel course, the automatic traveling vehicle comprising:

a course information storage device to store information corresponding to the predetermined travel course;

a critical detection area storage device to store information representative of an actual area defined by a radiated medium through a predetermined angular range;

a current position detection device to determine a current position of the vehicle relative to the predetermined course during travel;

an object detector to detect objects in a path of the vehicle during travel, wherein the object detector directionally radiates a medium in accordance with a signal; and a controller, coupled to the course information storage device, the critical detection area storage device, the current position detection device, and the object detector, which receives information from at least the course information storage device, the critical detection area storage device, the current position detection device, and the object detector and outputs the signal, wherein the signal represents a direction for radiating the medium.

15. An automatic traveling vehicle in accordance with claim 14, further comprising a vehicle speed control actuator, coupled to the controller, to control a speed of the vehicle in accordance with a speed control signal from the controller.

16. An automatic traveling vehicle in accordance with claim 15, further comprising a predetermined speed storage device, coupled to the controller, to store predetermined speed settings, wherein the controller selects a predetermined speed setting and supplies the speed control signal to the vehicle speed control actuator, where the speed control signal represents the predetermined speed setting.

17. An automatic traveling vehicle in accordance with claim 15, further comprising an actual vehicle speed detector, coupled to the controller, to detect an actual speed of the vehicle during travel.

18. An automatic traveling vehicle in accordance with claim 17, further comprising a predetermined speed storage device, coupled to the controller, to store predetermined speed settings, wherein the controller selects a predetermined speed setting from the predetermined speed storage device based on a detected speed of the vehicle and supplies the speed control signal to the vehicle speed control actuator, where the speed control signal represents the predetermined speed setting.

19. A method of controlling an automatic traveling vehicle to travel along a predetermined course, the steps comprising:

providing information representative of the predetermined course;

initiating movement of the vehicle along the predetermined course;

detecting objects in a path of the vehicle by transmitting a medium in a direction and evaluating the medium reflected from any objects in the direction;

determining the direction to transmit the medium based on at least the information representative of the predetermined course; and adjusting a current vehicle speed based on detected objects.

20. A method in accordance with claim 19, further comprising the step of:

determining a current position of the vehicle relative to the predetermined course, and wherein the step of determining the direction to transmit the medium is further based on the current position of vehicle relative to the predetermined course.

21. A method in accordance with claim 19, further comprising the step of:

determining a critical detection area representative of an actual area defined by the medium radiated through a predetermined angular range, and wherein the step of determining the direction to transmit the medium is further based on the critical detection area.

22. A method of controlling an automatic traveling vehicle to travel along a predetermined course, the steps comprising:

providing information representative of the predetermined course;

initiating movement of the vehicle along the predetermined course;

detecting objects in a path of the vehicle by transmitting a medium in a direction and evaluating the medium reflected from any objects in the direction;

determining the direction to transmit the medium based on at least the information representative of the predetermined course;

adjusting a current vehicle speed based on detected objects; and determining a critical detection area representative of an actual area defined by the medium radiated through a predetermined angular range, and wherein the step of determining the direction to transmit the medium is further based on the critical detection area; and wherein the step of adjusting current vehicle speed includes:

determining a current position of the vehicle relative to the predetermined course, providing a plurality of predetermined speed settings, wherein each predetermined speed setting corresponds to a braking distance;

determining a current speed of the vehicle;

determine a farthest distance from the current position of the vehicle in an area defined by overlapping the critical detection area with the predefined course; and adjusting the current vehicle speed to a speed not to exceed a predefined speed setting having a corresponding braking distance equal to the farthest distance.

\* \* \* \* \*